United States Patent [19]

Moore et al.

[11] 4,206,054
[45] Jun. 30, 1980

[54] PYRAMIDIC AQUARIUM FILTER-AERATOR

[76] Inventors: Leon Moore, 3922 W. Lexington St.; George E. Smith, Jr., 4220 W. Gladys, both of Chicago, Ill. 60624

[21] Appl. No.: 955,249

[22] Filed: Oct. 27, 1978

[51] Int. Cl.² ............................................. E04H 3/20
[52] U.S. Cl. ................................................ 210/169
[58] Field of Search ........................ 210/169; 119/3, 5

[56] References Cited

U.S. PATENT DOCUMENTS

| | | | |
|---|---|---|---|
| 2,653,908 | 9/1953 | Rodda | 210/169 |
| 2,744,065 | 5/1956 | Lacey | 210/169 |
| 2,782,161 | 2/1957 | Willinger et al. | 210/169 |
| 2,786,026 | 3/1957 | Stark | 210/169 |
| 3,247,826 | 4/1966 | Girard | 210/169 |
| 3,347,211 | 10/1967 | Falkenberg et al. | 210/169 |
| 3,362,537 | 1/1968 | Cline | 210/169 |
| 3,477,580 | 11/1969 | Willinger | 210/169 |
| 3,483,985 | 12/1969 | Axelrod | 210/169 |
| 3,624,777 | 11/1971 | Gardner | 210/169 |
| 3,720,317 | 3/1973 | Willinger | 210/169 |
| 3,746,168 | 7/1973 | Willinger et al. | 210/169 |
| 3,746,169 | 7/1973 | Willinger et al. | 210/169 |
| 4,025,431 | 5/1977 | Saxton | 210/169 |

*Primary Examiner*—Theodore A. Granger
*Attorney, Agent, or Firm*—Neuman, Williams, Anderson & Olson

[57] ABSTRACT

An aquarium filter-aerator device having a substantially pyramidic construction with water inlets on all sides that operates on an air-induced water flow principle anywhere along the bottom of an aquarium. The filter-aerator has an inner construction that defines a pre-filter chamber which accumulates impurities and a post-filter chamber for aerating the purified aquarium water. The particular construction and disposition of the filter-aerator facilitates the forming of a plurality of directional water currents to sweep aquarium impurities into the filter-aerator.

9 Claims, 4 Drawing Figures

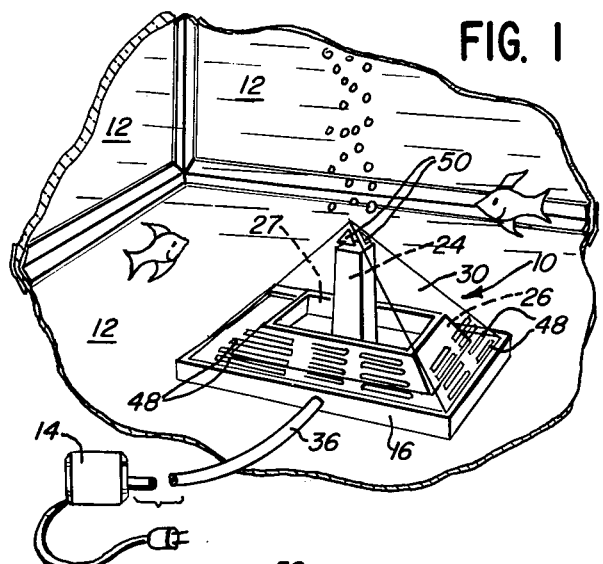
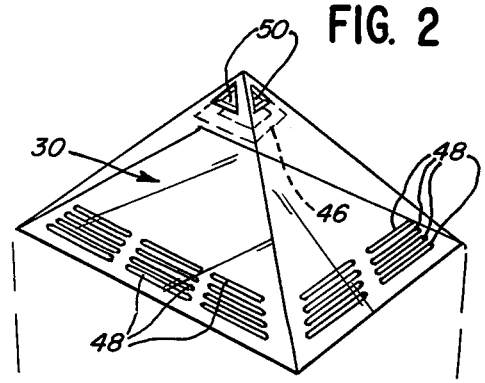
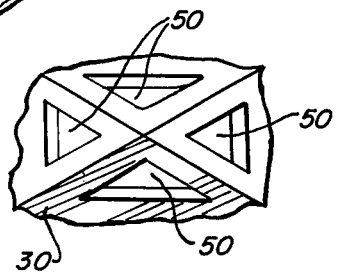
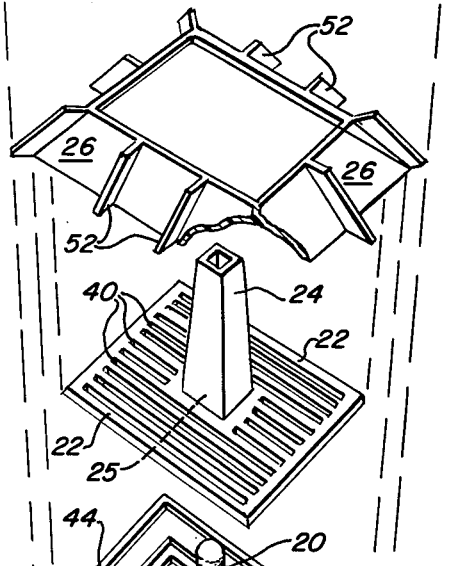
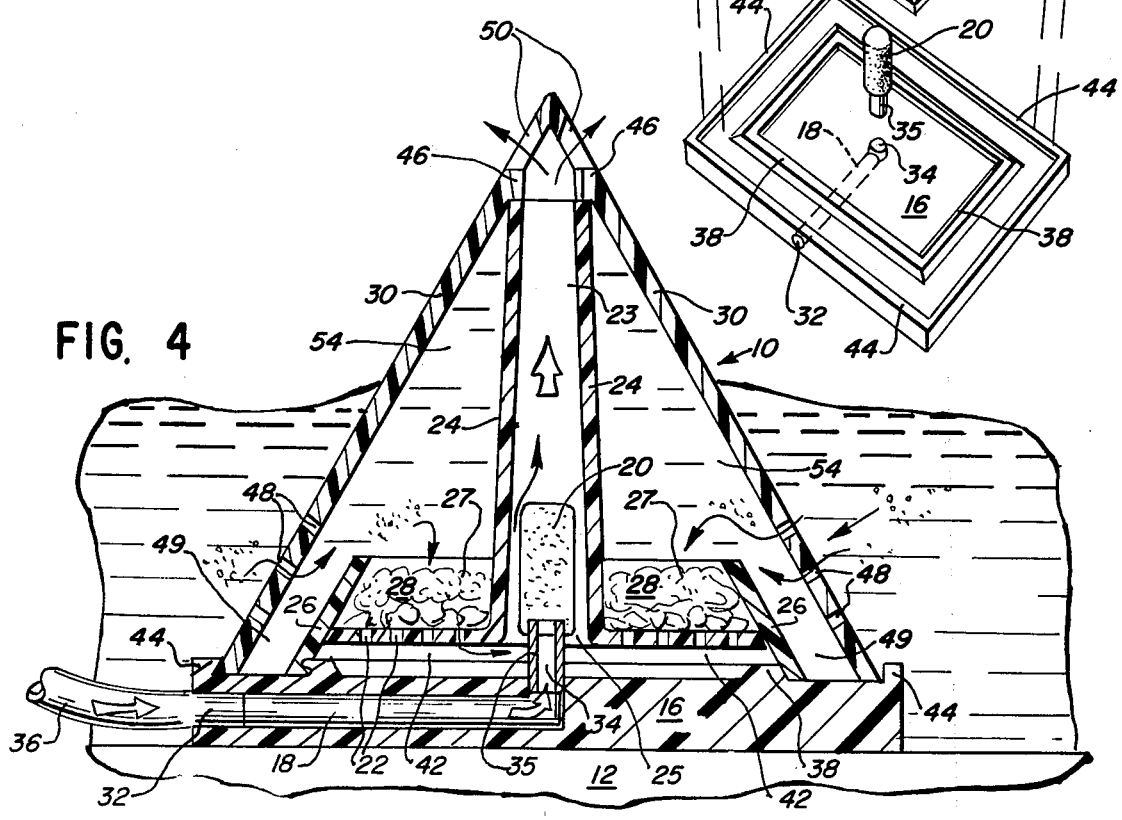

PYRAMIDIC AQUARIUM FILTER-AERATOR

BACKGROUND OF THE INVENTION

This invention relates generally to aquarium filter devices, and more particularly to devices that circulate, aerate, and filter the water in an aquarium.

Aquatic life cultivated within a tank or aquarium requires noncontaminated water and air to survive. Without utilizing some means of filtering and aerating the water, the life span of the aquatic life is significantly reduced. A number of devices designed to perform both the filtering and aeration functions have been developed. Such devices usually operate by pumping air into a water column; as the air rises and partially dissolves into the water, it induces a current that draws more water through a filtering assembly. The present invention incorporates the air-induced water flow principle in a manner which more efficiently filters out impurities than devices in the prior art. It is an object of the present invention to provide an improved water filter and aerator for aquarium use and particularly a filter-aerator which affords water intake currents from all sides and allows the invention to be positioned anywhere along the aquarium's bottom.

Another object of the present invention is to reduce the frequency of filter changes by providing a baffle which allows the invention to capture impurities thereby maximizing the useful life and efficiency of the filter.

A further object of the present invention is to provide an aesthetically pleasing filtering device that is easy to assemble and dismantle because of its snap-lock construction, thus, facilitating cleaning and filter changes.

Other objects and advantages of the invention will become apparent upon reading the following detailed description and appending claims, and upon reference to the accompanying drawings.

SUMMARY OF THE INVENTION

The aquarium filter-aerator of this invention has a substantially pyramidic shape with snap-lock assembly, water intake slots on all sides, an inner baffle, a water filter and filter grid, a force air supply delivery element, and a water aeration column.

The present invention's pyramidic construction allows placement of the invention anywhere along the bottom of the aquarium. Disposition of the invention in the center of the aquarium maximizes the directions of water intake currents, yet avoids excessive water turbulence and unsightly protrusion of air tubes and aeration columns. By increasing the directions of water intake currents as compared to prior art devices, the likelihood that a portion of the aquarium will accumulate contaminants and lack sufficient aeration due to the absence of current flow is diminished. Excessive water turbulence is avoided because the volume of water flow through the filtering assembly is directly related to the amount of air inserted into the water column. Thus, the current strength produced is reduced as the water intake area is increased by having water intake slots on all sides of the invention. Since the air supply tube enters at the invention's base and the water column is disposed within the pyramidic structure, there is no unsightly protrusion of assemblage when the invention is placed in the center of the aquarium.

BRIEF DESCRIPTION OF THE DRAWINGS

For a more complete understanding of this invention, reference should now be had to the embodiments illustrated in greater detail in the accompanying drawings and described below. In the drawings:

FIG. 1 is a perspective view of a pyramidic filter-aerator employing teachings of this invention as disposed at the bottom of an aquarium;

FIG. 2 is an exploded perspective view of the pyramidic filter-aerator of FIG. 1;

FIG. 3 is a fragmentary top plan view of the pyramidic cover illustrating the aerated water escape outlets; and FIG. 4 is a sectional view of the pyramidic filter-aerator illustrating the directional flow of air and water and showing the interior construction thereof.

DESCRIPTION OF THE PREFERRED EMBODIMENTS

Referring now to the drawings, a rectangular pyramidic filter-aerator 10 may be used to filter, circulate, and aerate the water within an aquarium 12. The filter-aerator 10 utilizes an air induced water flow principle to draw unclean water through a filter and into an aeration chamber 23. Air is pumped by a conventional aquarium air pump 14 into the aeration chamber 23, causing a water flow as the escaping air rises.

As shown in FIGS. 1, 2 and 4, the pyramidic filter-aerator 10 comprises in combination; a base 16 with a lateral inlet air conduit passage 18; a foraminous air delivery element 20; a filter grid 22 with a hollow columnar section 24 and an inner baffle 26 delimiting a recepticle 27 for containing a filtering material 28; and a substantially rectangular pyramidic cover 30. The base 16 has an air conduit passage 18 with a side entry portal 32 and a centrally disposed exit portal 34. Said entry portal 32 has a means for coupling an air supply tube 36 to the air conduit passage 18 as by a telescopic inter-fitting engagement. Said exit portal 34 is defined by a vertically oriented outlet section 35 and has a means for coupling the air delivery element 20 to the air conduit passage 18. The filter grid 22 is a perforated or slotted plate which has a plurality of grid openings 40 providing a means for water flow therethrough. The hollow columnar section 24 circumscribes a central passage 25 in grid 22 and extends upwardly to define a water aeration chamber 23 and to position the air delivery element 20. The column 24 may be formed unitary with or be solidly affixed to the grid 22 about the passage 25. An inner baffle 26 circumscribes and is affixed to the peripheral edge of the filter grid 22. The baffle 26 rests on the base 16 and supports the grid 22 in spaced relation thereto to define a water flow space 42 when the filter grid 22 is in position. The lower edge of wall 26 engages around a guide ridge 38 of the base 16 for locating the assembly comprising the grid 22, the column 24 and baffle 26. While the ridge 38 is illustrated as being continuous to enhance the seal effect between the baffle 26 and base 16, alternatively the ridge 38 may be supplanted by a series of spaced sections, nubs or other locators on base 16. Also, overlapping detents may be provided on the baffle 26 and ridge 38 to provide a snap interlock when the parts are assembled, e.g. as illustrated at the left side of FIG. 6.

Filtering material 28 of a known type, e.g. cotton batting, steel wool, charcoal, etc., is disposed upon the filter grid 22 in the receptacle 27 defined between baffle 26 and column 24, substantially as shown in FIG. 4. The cover 30 rests upon the base 16 such that it engages within an outer ridge 44 of the base 16, preferably in a snap-lock fashion. An inner shoulder 46 is provided near the top of the cover 30 to fit flush with the top of the water aeration column 24. Said cover 30 has a plurality of water intake openings 48 generally located around the periphery to allow water passage from all sides and near the bottom to sweep clean the aquarium floor. The openings 48 are generally opposite the baffle 26 and outside of the vertical projection of baffle 26 so that particles drawn through upper openings 48 fall outside of the baffle 26 into a particle catch chamber 49. It is preferred that the intake openings 48 be slots because slots afford maximum aperture area admitting water and impurities but not aquatic animal life. It is to be understood that other opening forms and dispositions may be utilized. Said cover 30 also has escape openings 50 (see particularly FIG. 3) disposed nearer the pyramidic apex above the shoulder 46 affording air and aerated water a means of escape from the filter-aerator. Said escape openings 50 may be of any shape so long as they are sized to not admit aquatic animal life.

Another preferred embodiment of the filter-aerator 10 has a plurality of vanes 52 affixed to the inner baffle 26 substantially as shown in FIG. 2. Said vanes 52 accentuate the directional water flow and provide a support means for the cover 30.

Operation of the filter-aerator 10 of this invention cleans and aerates the water within an aquarium 12 by using an air induced water flow principle. Air is pumped into the filter-aerator 10 in a direction illustrated by the large arrows of FIG. 4. The air escapes through the air delivery element 20 and rises within the aeration chamber 23 where a portion of the air is dissolved into the water. As the air rises, it causes a water flow in the directions illustrated by the small arrows of FIG. 4. The aerated water escapes through the openings 50 and is routed into directional currents which circulate about all sides of the pyramidic structure.

Water with impurities normally found in aquariums is drawn through the openings 48 into the pre-filter chamber 54 by the air induced currents. Impurities too heavy to be carried by the current over the inner baffle 26 fall to rest at the bottom of the catch chamber 49 on the base 16. These impurities, although drawn into the filter-aerator 10, do not clog the filter material 28. Thus, the cleaning frequency for the filter-aerator 10 is significantly reduced. The impurities that are carried over the baffle 26 are captured by the filter material 28 as the water flows from the pre-filter chamber 54 through the filter material 28, and into the water flow space 42. The cleansed water flows into the aeration chamber 23 where it is aerated, thus completing the filter-aeration cycle.

The directional currents created by the forced air are not as strong as currents created by conventional corner aquarium filters moving the same volume of air and water. Since the volume of water flow through a filter assembly is directly related to the amount of air inserted into the filter, current strength is reduced because of the increased water intake area by having intake slots on all sides of the invention. Thus, excessive water turbulence is avoided. Nonetheless, the current produced is sufficiently strong to draw impurities into the filter-aerator 10.

By utilizing water intake openings 48 and escape openings 50 on all sides of the filter-aerator 10, a plurality of currents is produced that substantially increases the likelihood that the entire aquarium 12 will be swept clean of contaminants and receive sufficient aeration due to the current flow.

The filter-aerator 10 of this invention is sturdy and easy to construct. It is preferred that the filter-aerator be constructed of a non-toxic plastic material, however, other materials may be used. The configuration of the various components of the filter-aerator 10 are easily adaptable to a mold construction, and when assembled, can serve an ornamental purpose as well as a functional purpose within the aquarium 12. Also, a snap-lock construction provides easy dismantling and assembly for cleaning purposes.

While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A two-stage aquarium filter-aerator for filtering, circulating, and aerating aquarium water comprising:
   a base;
   an inner assembly supported by said base comprising a filter grid, a columnar enclosure for defining an aeration chamber, a peripheral baffle wall, and filtering material disposed within a filter chamber defined by said baffle wall and said filter grid;
   an air delivery element in said aeration chamber;
   a means for communicating air to said air delivery element; and
   a cover disposed over said base and said inner assembly in spaced relationship with said baffle wall such that said cover cooperates with said baffle wall and said base to define a particle retention chamber, said cover also having intake openings on all sides of its periphery and spaced outward of said peripheral baffle and outlet openings above said aeration chamber, whereby the passage of air from said air delivery element through said aeration chamber will induce currents of impure water to flow through said intake openings, through a first stage of filtration in said particle retention chamber, over said baffle wall, through said filtering material disposed within said filter chamber as a second stage of filtration, into said aeration chamber and through said outlet openings in said cover.

2. A filter-aerator as described in claim 1 wherein said filter-aerator may be disposed along the bottom of an aquarium in a substantially central location such that no part thereof protrudes from the aquarium water except an air supply tube which exits the water along the side or at the corner of the aquarium.

3. A filter-aerator as described in claim 1 wherein said cover is rectangular pyramidic with intake and outlet openings on all four sides to facilitate the creation of directional water currents.

4. A filter-aerator as described in claim 1 wherein said intake openings are arranged near the bottom of said cover such that the uppermost intake opening is outward the vertical projection of said baffle.

5. A filter-aerator as described in claim 1 wherein said intake openings are slots.

6. A filter-aerator as described in claim 1, wherein said filter-aerator has a snap-lock construction providing easy assembly and dismantling.

7. A filter-aerator as described in claim 1 wherein said baffle has vanes that channel incoming water, accentuate directional currents, and provide support for said cover.

8. A filter-aerator as described in claim 1 wherein said cover has a support shoulder that aligns with the top of said aeration column such that the combination defines distinct compartments comprising a two-stage filtering compartment for unclean water and a pot-filter compartment for clean and aerated water.

9. A filer-aerator as described in claim 1 wherein said filter-aerator is constructed of a non-toxic plastic material.

* * * * *

UNITED STATES PATENT AND TRADEMARK OFFICE
CERTIFICATE OF CORRECTION

PATENT NO. : 4,206,054
DATED : June 3, 1980
INVENTOR(S) : Leon Moore and George E. Smith, Jr.

It is certified that error appears in the above-identified patent and that said Letters Patent are hereby corrected as shown below:

In the title of the Abstract page change "Jun. 30," to

--Jun. 3,--

Column 1, line 45, "force" should be --forced--

Claim 8, Column 6, line 3, "pot-filter" should be

--post-filter--

Signed and Sealed this

Twenty-eighth Day of October 1980

[SEAL]

Attest:

SIDNEY A. DIAMOND

Attesting Officer

Commissioner of Patents and Trademarks